Patented Dec. 6, 1949

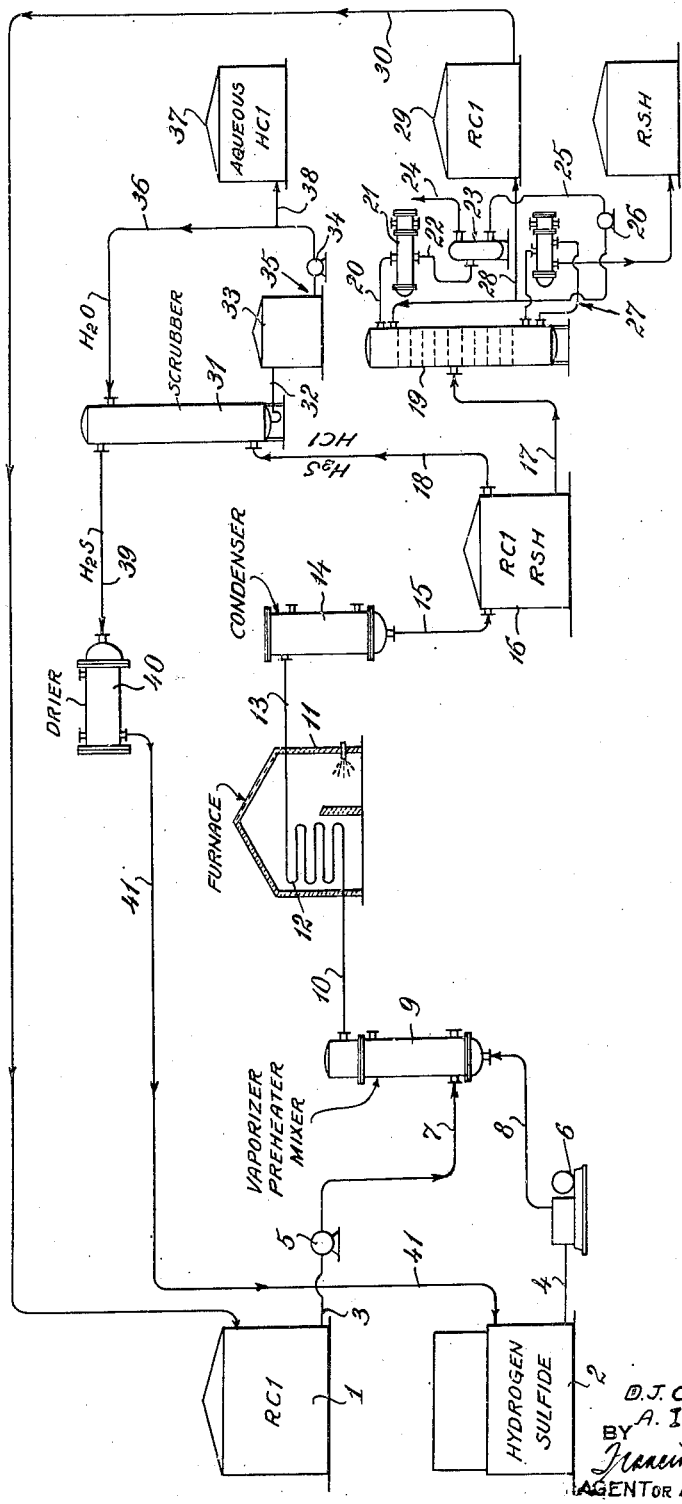

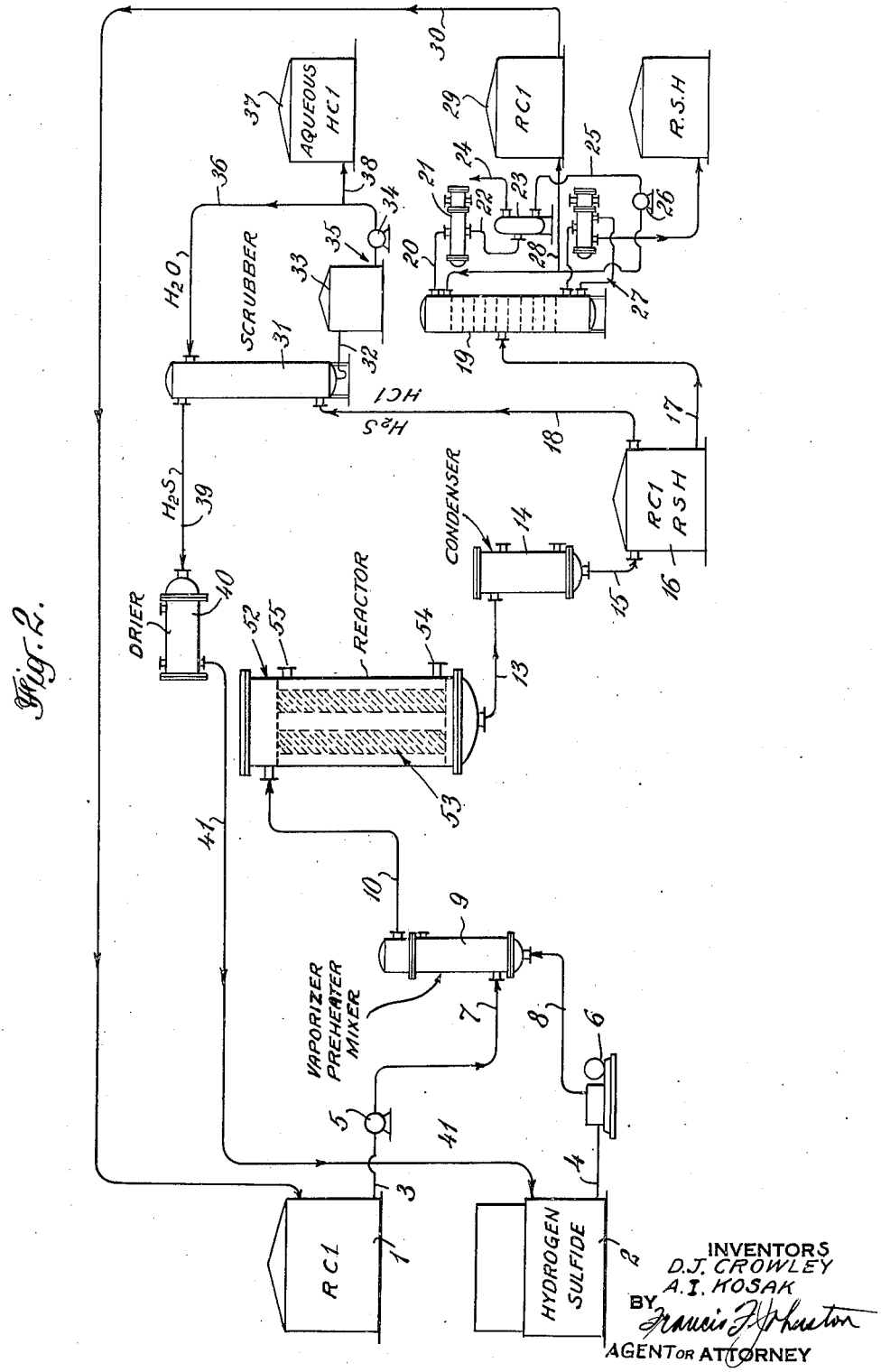

2,490,257

UNITED STATES PATENT OFFICE 2,490,257

MONO- AND POLYALKYL MONO- AND POLYNUCLEAR MERCAPTANS

Duncan J. Crowley, Penns Grove, N. J., and Alvin I. Kosak, Columbus, Ohio, assignors to Socony-Vacuum Oil Company, Incorporated, a corporation of New York Application May 15, 1946, Serial No. 669,894

13 Claims. (Cl. 260—609)

The present invention relates to the preparation of mono- and polynuclear mono- and polyaryl mercaptans and, more particularly, to the production of thiophenols by a vapor phase reaction.

The most common method for the production of thiophenols involves reduction of an aromatic sulfonyl chloride with zinc and aqueous acid or with stannous chloride. Thiophenols may also be obtained by the reaction of cold solutions of a diazonium salt and potassium ethyl xanthate. Upon warming the reaction mixture an S-aryl ethyl xanthate is formed. This latter product hydrolyzes in alkaline solution to a thiophenol. Other methods also give thiophenols. Thus, thiophenols have been obtained in poor yields by the reaction of phenols with phosphorous pentasulfide and by the reaction of aromatic compounds with sulfur in the presence of aluminum chloride. Aryl halides in which the halogen is activated by the presence of other substituents react with thiourea to produce substituted thiophenols, for example, 2-mercapto-5-nitropyridine can be obtained from 2-chloro-5-nitropyridine by this method. Another method is disclosed in U. S. Patent No. 1,825,622. According to the disclosure of this patent, thiophenol is obtained in practical amounts when chlorobenzene is reacted with aqueous concentrated alkali metal sulfhydrate saturated with hydrogen sulfide at 1 to 2 atmospheres and at 250 degrees centigrade in the presence of sufficient of the corresponding thioether to maintain the system in an approximate state of chemical balance. It is to be observed that this process is carried out in liquid phase in contradistinction to the method of the present invention. Furthermore, it is to be noted that satisfactory operation of the patented process is dependent upon the maintenance of an effective amount of dibenzyl sulfide in the reaction mixture. It now has been discovered that, in distinct contrast to the prior art methods involving liquid phase reactions and the maintenance of an effective amount of side-reaction products in the liquid reaction mixture, thiophenols and, in general, aromatic mercaptans can be produced by a vapor phase process.

Accordingly, it is an object of the present invention to provide a means for producing aromatic mercaptans from aromatic halides and hydrogen sulfide by reaction in the vapor phase. Another object of the present invention is to provide a means for producing aromatic mercaptans in general and, specifically, thiophenols in which aromatic halides and hydrogen sulfide are reacted in the vapor phase in the presence of a catalyst. Other objects and advantages will become apparent from the following description taken in conjunction with the drawings in which Figure 1 is a more or less diagrammatic illustration of one means of operation, and Figure 2 is a more or less diagrammatic illustration of another mode of operation.

In general, the method of the present invention provides for reacting the aromatic halide in the vapor phase with hydrogen sulfide or a substance giving off hydrogen sulfide at the reaction temperature. Excess hydrogen sulfide is separated from the reaction products and the aromatic sulfhydryl separated from unreacted aromatic halide.

The reaction may be carried out in the presence of a catalyst at lower temperatures than those at which the reaction takes place in the absence of a catalyst. For example, temperatures of about 700 degress to about 1300 degrees Fahrenheit have been found to be satisfactory. The reaction can be carried out at superatmospheric, atmospheric or subatmospheric pressures.

The reactants are passed through the heated reaction zone, preferably, concurrently. Upon condensation, the liquid product consists of the aromatic mercaptan and the unreacted aromatic halide. The aromatic sulfhydryl is purified by distillation or other suitable methods and the aromatic halide re-used. It is preferred to employ an amount of hydrogen sulfide in excess of that required to satisfy the following equation:

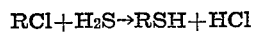

$$RCl + H_2S \rightarrow RSH + HCl$$

That is to say, the hydrogen sulfide, preferably, is present in amount in excess of equimolecular proportion.

The reaction set forth hereinbefore can be carried into practice employing equipment such as that illustrated in Figures 1 and 2. Thus, aromatic halide in tank 1 and hydrogen sulfide or material capable of releasing hydrogen sulfide under the conditions of the reaction held in tank 2 pass through lines 3 and 4, respectively, to pumps 5 and 6 and thence by lines 7 and 8 to the vaporizer and preheater 9. The commingled reactants pass through conduit 10 to furnace 11 of any suitable construction. In furnace 11 is reaction zone 12 comprising a conduit of sufficient capacity to provide the necessary residence time for the reaction, and in which a temperature higher than about 550 degrees Fahrenheit, say about 800 to about 1300 degrees Fahrenheit, is maintained. The reaction products together with excess hydrogen sulfide (under preferred conditions) pass through conduit 13 to condenser 14 and thence by pipe 15 to receiver 16 wherein the condensed aromatic mercaptan or sulfhydryl or other aromatic sulfur-containing reaction product and unreacted aromatic halide are collected and withdrawn as at 17 while the uncondensed hydrogen halide and hydrogen sulfide, if present, are withdrawn at 18. The mixture of aromatic sulfur compound and unreacted aromatic halide withdrawn through 17 passes to rectifying or fractionating column 19. In column 19 the unreacted aromatic halide is taken overhead through 20 to condenser 21 and passed through line 22 to receiver 23. Uncondensed gases are vented from receiver 23 through 24 while condensed aromatic halide is withdrawn through 25 by means of pump 26. The halide withdrawn by pump 26 is distributed by pipes 27 and 28, respectively, to tower 19 as reflux and to receiver 29. Halide in receiver 29 is delivered through conduit 30 to storage tank 1 for recycle.

The hydrogen halide and hydrogen sulfide collected in receiver 16 is withdrawn through line 18 to scrubber 31 in which the gases are washed with water or other suitable solvent for hydrogen halide either counter-currently or concurrently. The solution of hydrogen halide is withdrawn through line 32 to container 33 from which pump 34 withdraws the solution through line 35 and delivers part of the solution through line 36 to the scrubber and part to the storage tank 37 through line 38.

The gaseous hydrogen sulfide is withdrawn from scrubber 31 through line 39 and passed to drier 40 of any suitable type. From the drier the hydrogen sulfide is passed through line 41 to container 2.

Figure 2 depicts in a more or less diagrammatic manner the flow of materials through a modification of the present invention employing a catalyst. (Similar pieces of equipment are designated by the same indicia.) A mixture of the preheated aromatic halide and hydrogen sulfide in line 10 pass into reactor 52 having catalyst masses 53 maintained at reaction temperature by heat transfer medium introduced into the reactor at 54 and withdrawn at 55. (The heat transfer medium is maintained at a suitable temperature by any suitable means not shown.) The reaction products and unreacted starting materials are withdrawn from reactor 52 through pipe 13 to condenser 14. The condensed halide and aromatic sulfur compound together with uncondensed hydrogen halide and hydrogen sulfide pass through line 15 to receiver 16. Thereafter the operations are substantially the same as those described in conjunction with Figure 1.

Data obtained from a number of runs have been collected in Table I. It is to be noted that the process is capable of producing more than 10 per cent aromatic sulfhydryl per pass based on the weight of aromatic halide charged.

TABLE

*Production of thiophenol by reaction of chlorobenzene and hydrogen sulfide in the vapor phase at atmospheric pressure*

| Run No. | Catalyst | Conditions | | | | Product Distribution | | |
|---|---|---|---|---|---|---|---|---|
| | | Reaction Temp., °F. | Contact Time, Sec. | Mole Ratio H$_2$S:Cl | Chlorobenzene Charged Total Amt., Grams | Per Cent Thiophenol Yield (Wt.) C$_6$H$_5$Cl Used Up | Per Cent Thiophenol Conversion (Wt. C$_6$H$_5$Cl Charged) | Per Cent Chlorobenzene Recovered |
| 1[1] | Activated Alumina (Mesh ¼" Pellets) | 723 | 35.1 | 0.30 | 111 | 4.1 | 0.6 | 84.7 |
| 2[1] | ...do... | 1,010 | 8.0 | 2.98 | 103 | 25.0 | 7.3 | 71.0 |
| 3[1] | ...do... | 522 | 11.4 | 2.80 | 122 | 0 | 0 | 77.0 |
| 4[1] | ...do... | 1,140 | 7.0 | 3.01 | 105 | 14.5 | 0.4 | 35.0 |
| 5 | Wood Charcoal (6-8 Mesh) | 982 | 8.6 | 3.05 | 122 | 37.6 | 12.6 | 66.5 |
| 6 | Silica Bead (Mesh 6-12) | 1,027 | 6.3 | 3.18 | 122 | 12.4 | 5.9 | 52.5 |
| 7 | Silica Alumina Bead (Mesh 6-12) | 1,235 | 4.5 | 2.93 | 125 | 8.0 | 5.5 | 31.2 |
| 8 | Silica, Alumina, Iron Gel (Mesh 4-8) | 1,012 | 5.1 | 1.63 | 232 | | 2.3 | |
| 9[2] | None | 1,000 | 10.3 | 2.58 | 179 | 16.7 | 6.2 | 61.6 |
| 10[2] | ...do... | 840 | 10.7 | 2.50 | 149 | 8.8 | 2.4 | 72.5 |
| 11[2] | ...do... | 710 | 12.0 | 2.73 | 142 | 0 | 0 | 79.3 |

[1] Hydrogen sulfide at 600-700° F. was passed over catalyst for several hours.
[2] Column packed with ¼" glass raschig rings.

It is to be observed that in general those alkylated monohalobenzenes in which the alkyl group has more than 7 carbon atoms will be subjected to fission of the alkyl chain or even to dealkylation, with the result that the product will be an alkaryl mercaptan with a shorter side chain or an aryl mercaptan. Thus, for example, methyl and dimethyl monochloro naphthalene may be reacted with hydrogen sulfide at a temperature above that at which the alkyl halonaphthalene is vaporized, say about 550 degrees Fahrenheit. In short, the number and type of alkyl groups are only limited by considerations of steric hinderance. Similarly, mono-, di-, and polyhalo- mono- and polynuclear aromatic hydrocarbons may be employed in this reaction and corresponding sulfur compounds obtained. However, the polyhaloaromatic hydrocarbons become less reactive than the monohaloaromatic hydrocarbons and in symmetrical trichlorobenzene the chlorine atoms have a mutually deactivating influence. The reaction is substantially the same in that hydrogen sulfide in excess of the amount indicated by the following equations is used:

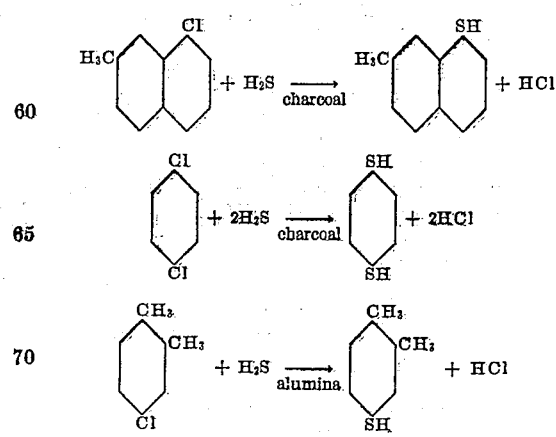

In addition to the mono- halo- mononuclear aromatic compounds which have been enumerated hereinbefore, several other classes or types of compounds may be treated in a similar manner. For example, monohalogenated alkylated mononuclear aromatic hydrocarbons such as tolyl halides and xylyl halides, $ClC_6H_4CH_3$ and $ClC_6H_3(CH_3)_2$ respectively, and monochloro mesitylene, monochloro hemimellitine and monochloro pseudocumene $[(CH_3)_3C_6H_2Cl]$ and, in general, mono- and polyalkylated monohalo benzenes in which one or more of the alkyl groups have up to and including 24 to 26 carbon atoms, may be used. As an example of an alkylated benzene having an alkyl chain having 24 to 26 carbon atoms is one in which the benzene has been alkylated with paraffin wax which is known to comprise hydrocarbons having 24 to 26 carbon atoms in the molecule. These compounds may be represented generically by the following formula:

$$(C_nH_{2n+1})_a \cdot C_6H_{(4-a)}X_2$$

where $n = 1$ to $26$,
$a = 1$ to $5$, and
$X = $ halogen.

The corresponding dihalogenated mono- and polyalkylated benzenes having one or more alkyl substituents having up to and including 24 to 26 carbon atoms may likewise be used in this reaction. Such compounds are represented by the formula:

$$(C_nH_{2n+1})_a \cdot C_6H_{(4-a)}X_2$$

where $n$, $a$ and $X$ have the same meaning as heretofore. However, it is preferred to use the para- and meta- dihalogenated compounds and especially the paradihalogenated compounds.

Similarly, the mono- and dihalogenated, mono- and poly- alkylated polynuclear aromatic compounds may be employed. The alkyl groups may consist of one or more alkyl groups having up to 24 to 26 carbon atoms. Such compounds may be illustrated by reference to the naphthalene and anthracene series and represented by the following formulae:

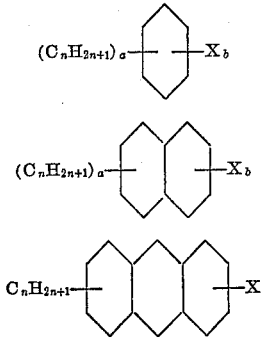

where $n = 1$ to $26$,
$a = 1$ to $4$,
$b = 1$ to $2$,
$X = $ halogen.

Accordingly, this invention includes within its scope the reaction in vapor phase at superatmospheric, atmospheric, or subatmospheric pressures, at temperatures above that at which the haloaryl compound is vaporized, say at temperatures of 700 to 1200 degrees Fahrenheit, in the presence or absence of a catalyst between a mono- or dihalogenated, alkylated or non-alkylated, mono- or polynuclear aromatic compound and hydrogen sulfide. In other words, the present invention provides for reacting a halogenated aromatic compound selected from the group consisting of mono- and dihalogenated benzenes, mono- and dihalogenated mono- and polyalkyl benzenes in which 1 or more of the alkyl groups has up to 24 to 26 carbon atoms, mono- and dihalogenated polynuclear aromatic compounds and mono- and dihalogenated mono- and polyalkyl polynuclear aromatic compounds in which 1 or more of the alkyl substituents has up to 24 to 26 carbon atoms.

We claim:

1. A vapor phase method for producing thiophenol which comprises reacting chlorobenzene and hydrogen sulfide at temperatures of at least 700 degrees Fahrenheit.

2. A vapor phase method for producing thiophenol, which comprises reacting chlorobenzene and hydrogen sulfide at temperatures of at least 700° F. in the presence of a highly absorbent solid catalyst.

3. A vapor phase method for producing thiophenol which comprises reacting chlorobenzene and hydrogen sulfide at temperatures of at least 700 degrees Fahrenheit in the presence of wood charcoal.

4. A vapor phase method for producing thiophenol which comprises reacting chlorobenzene and hydrogen sulfide at about 700 to about 1300 degrees Fahrenheit.

5. A vapor phase method for producing thiophenol which comprises reacting chlorobenzene and hydrogen sulfide at about 700 to about 1300 degrees Fahrenheit in the presence of wood charcoal.

6. A vapor phase method for producing thiophenol which comprises reacting chlorobenzene and hydrogen sulfide in the presence of activated alumina at temperatures of about 700 to about 1300 degrees Fahrenheit.

7. A vapor phase method for producing aromatic compounds having the (SH) group attached to nuclear carbon which comprises reacting a nuclear halogenated aromatic hydrocarbon with hydrogen sulfide in the vapor phase at temperatures in excess of 550° F.

8. The method as described and set forth in claim 7 wherein a highly absorbent solid catalyst is employed.

9. The method as described and set forth in claim 7 wherein the halogenated aromatic hydrocarbon has a composition conforming to the formula:

$$(C_nH_{2n+1})_aC_6H_{[6-(a+b)]}X_b$$

where $n$ is 1 to 26, $a$ is a halogen selected from the group consisting of 1 to 5 and X is chlorine, bromine and iodine, and $b$ is 1 to 2.

10. The method as described and set forth in claim 7 wherein the halogenated aromatic hydrocarbon is a halogenated polynuclear aromatic hydrocarbon having 1 to 4 alkyl groups having 1 to 26 carbon atoms and having 1 to 2 halogen atoms attached to nuclear carbon.

11. The method described and set forth in claim 7 wherein the temperature is about 700 to about 1300 degrees Fahrenheit.

12. The method described and set forth in claim 11 wherein wood charcoal is employed as a catalyst.

13. The method described and set forth in claim 11 wherein activated alumina is employed as a catalyst at temperatures of at least 700° F.

DUNCAN J. CROWLEY.
ALVIN I. KOSAK.

(References on following page)

REFERENCES CITED

The following references are of record in the file of this patent:

UNITED STATES PATENTS

| Number | Name | Date |
|---|---|---|
| 2,438,838 | Ballard et al. | Mar. 30, 1948 |

OTHER REFERENCES

Karrer, "Organic Chemistry," 2nd English edit. (1946), pages 114, 115; Elsevier, publishers, New York.

Chalkley, "J. Am. Chem. Soc.," vol. 51 (1929), pages 2489–2495.

Duffey et al., "Ind. & Eng. Chemistry," vol. 26 (1934), pages 91–93.

Certificate of Correction

Patent No. 2,490,257 December 6, 1949

DUNCAN J. CROWLEY ET AL.

It is hereby certified that errors appear in the printed specification of the above numbered patent requiring correction as follows:

Column 1, line 26, for the patent number "1,825,622" read *1,825,662*; column 5, line 20, for that portion of the formula reading "$C_6H_{(4-a)}X_2$" read $C_6H_{(5-a)}X$; and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*